United States Patent
Holzkämper et al.

(10) Patent No.: US 10,359,762 B2
(45) Date of Patent: Jul. 23, 2019

(54) PROCESSING UNIT, METHOD FOR OPERATING A PROCESSING UNIT AND USE OF A PROCESSING UNIT

(71) Applicant: SIG Technology AG, Neuhausen am Rheinfall (CH)

(72) Inventors: Peter Holzkämper, Baesweiler (DE); Thomas Hofmann, Osnabruck (DE)

(73) Assignee: SIG Technology AG, Neuhausen am Rheinfall (CH)

( * ) Notice: Subject to any disclaimer, the term of this patent is extended or adjusted under 35 U.S.C. 154(b) by 74 days.

(21) Appl. No.: 15/504,209

(22) PCT Filed: Jul. 1, 2015

(86) PCT No.: PCT/EP2015/064950
§ 371 (c)(1),
(2) Date: Feb. 15, 2017

(87) PCT Pub. No.: WO2016/026602
PCT Pub. Date: Feb. 25, 2016

(65) Prior Publication Data
US 2017/0269573 A1    Sep. 21, 2017

(30) Foreign Application Priority Data
Aug. 20, 2014 (DE) .................. 10 2014 012 186

(51) Int. Cl.
*G05B 19/409* (2006.01)

(52) U.S. Cl.
CPC .. *G05B 19/409* (2013.01); *G05B 2219/15083* (2013.01); *G05B 2219/23021* (2013.01); *G05B 2219/32014* (2013.01)

(58) Field of Classification Search
None
See application file for complete search history.

(56) References Cited

U.S. PATENT DOCUMENTS

| | | |
|---|---|---|
| 6,338,003 B1 | 1/2002 | Kamiguchi et al. |
| 8,032,253 B2 | 10/2011 | Nagata et al. |
| 2001/0029864 A1 | 10/2001 | Franke et al. |
| 2005/0237020 A1 | 10/2005 | Horstmann |
| 2005/0237343 A1 | 10/2005 | Kanda et al. |
| 2013/0052927 A1 | 2/2013 | Broemsen et al. |
| 2014/0028711 A1* | 1/2014 | Kincaid ............ G09G 3/20 345/633 |
| 2015/0205287 A1* | 7/2015 | Igarashi ............ B23Q 1/0045 318/591 |
| 2017/0046991 A1 | 2/2017 | Riegel |

FOREIGN PATENT DOCUMENTS

| | | |
|---|---|---|
| CN | 102962239 A | 3/2013 |
| CN | 103426367 A | 12/2013 |
| DE | 10240225 A1 | 3/2004 |

(Continued)

*Primary Examiner* — Stephen T. Reed
(74) *Attorney, Agent, or Firm* — The Webb Law Firm

(57) ABSTRACT

A processing facility having at least one processing station and at least one covering at least partly surrounding the processing station. The covering has at least one viewing window. Improved error correction is then made possible if a display unit displays at least one item of information about the processing station on the viewing window.

19 Claims, 6 Drawing Sheets

(56) References Cited

FOREIGN PATENT DOCUMENTS

| | | | |
|---|---|---|---|
| DE | 102006048143 | A1 | 4/2008 |
| DE | 102008047422 | A1 | 4/2010 |
| DE | 102011111949 | A1 | 2/2013 |
| DE | 102012010721 | A1 | 12/2013 |
| EP | 1588797 | A1 | 10/2005 |
| EP | 1850199 | A1 | 10/2007 |
| EP | 2910332 | A1 | 8/2015 |
| JP | 9244728 | A | 9/1997 |
| JP | 11156677 | A | 6/1999 |
| JP | 201214602 | A | 1/2012 |
| JP | 201222589 | A | 2/2012 |
| JP | 2013254063 | A | 12/2013 |
| WO | 2006103838 | A1 | 10/2006 |
| WO | 2012119109 | A1 | 9/2012 |
| WO | 2014054104 | A1 | 4/2014 |

\* cited by examiner

PROCESSING UNIT, METHOD FOR OPERATING A PROCESSING UNIT AND USE OF A PROCESSING UNIT

CROSS-REFERENCE TO RELATED APPLICATIONS

This application is the United States national phase of International Application No. PCT/EP2015/064950 filed Jul. 1, 2015, and claims priority to German Patent Application No. 10 2014 012 186.0 filed Aug. 20, 2014, the disclosures of which are hereby incorporated in their entirety by reference.

BACKGROUND OF THE INVENTION

Field of the Invention

The subject matter relates to a processing unit having at least one processing station and at least one covering partly surrounding the processing station, wherein the covering has at least one viewing window. In addition, the subject of the matter relates to a method for operating such a processing facility and to the use of such a processing facility.

Description of Related Art

Present-day processing facilities (aka. units) in the manufacturing industry, for example production facilities, production lines, packaging facilities, filling facilities or the like, are getting more complex. The requirements, regarding hygiene for example, are getting stricter and stricter due to statutory provisions. The dimensional accuracy and process reliability requirements have also been increased by product purchasers. A trouble-free production process must always be guaranteed, in which, in addition, traceability and monitorability of production processes and possible errors are required.

In order to maintain a trouble-free production flow and in order to be able to trace production steps, a large number of sensors are usually installed in the processing facilities. A processing facility usually has an infeed channel, through which a raw material is introduced into the installation, at least one processing station, in which the raw material is processed, and an outfeed channel, from which the processed product is output. A plurality of processing stations can be arranged sequentially one after another within a processing facility and in this way form a production line.

For operational safety reasons, processing facilities (aka. processing installations, processing units) are usually protected by covers. These covers, as a general rule, prevent a manual intervention, which involves a considerable risk of injury, from taking place during the production process. In addition, a covering at a processing station can become necessary for hygienic reasons. Finally, a cover (covering) of the processing station prevents production waste products from being released in an uncontrolled manner from the processing station into the surroundings. A covering (casing) does not always have to completely encase the processing station. It suffices if the covering is arranged like a wall or a tunnel between an operator of the processing station and the actual processing means of the processing station.

In the packaging industry, in particular in filling facilities (installations), processing stations arranged one after another can comprise, for example, an unfolding unit, a sterilisation unit, a filling unit and a closing unit. Here, for example, a package sleeve is firstly unfolded in the unfolding unit. Then, for example, a bottom of the package sleeve is closed and the unfolded package sleeve which is only open on one side is sterilised in a sterilising unit. Subsequently, the foodstuff can be filled into the sterilised unfolded package in an aseptic chamber. Afterwards, the package can be closed on the remaining open side. During its passage through the processing facility the package is moved from processing station to processing station by means of a conveying device, for example a conveyor belt. At least one viewing window can be provided in the covering at each processing station. The viewing window is arranged in such a way that it at least partly unblocks the view of the processing process or the operating means of the processing station. Of course, the processing stations mentioned can also be part of a system of the subject matter described below.

As has already been explained in the introduction, the number of sensors within a processing station is constantly increasing. Monitoring of the production processes is becoming more and more continuous and the processing steps are constantly becoming more complex. This results in a large number of parameters and states, such as temperature, pressure, throughput volume, speed, angular speed, distances or suchlike having to be monitored by sensors respectively suitable for this purpose. Temperature sensors, pressure sensors, throughput measuring devices, speed indicators, hygrometers, manometers, distance sensors, proximity sensors, photoelectric sensors, voltmeters, ammeters, cameras or suchlike can, for example, be used for this purpose. All these sensors supply actual-state data for respective parameters of the processing station. Of course, the sensors mentioned can also be part of a system of the subject matter described below.

For the operator, it is becoming steadily more complicated to monitor the whole processing station, so that he or she is able to intervene in the case of an error and correct the error. Since a large number of parameters must be monitored and set for the production process and a combination of erroneous parameters can lead to an unwanted outcome, the operator must be given the possibility of being able to monitor and/or readjust the parameters as easily as possible. To that end, nowadays the operator is informed in a user manual which parameters must be in which value ranges and how the parameters are to be monitored.

In the case of an error, the operator must consult the user manual, so that he or she can possibly correct the error himself or herself. If he or she is not able to do this, he or she must call in a technician qualified for this purpose, which unnecessarily halts the production process. As long as the error is not corrected, the whole processing facility stands idle.

In order to simplify the production process, it would be helpful to make means available to the operator to help him or her monitor the parameters of the processing station. Hence, the subject matter was based on an object of improving the operability of processing stations.

SUMMARY OF THE INVENTION

According to the subject matter, it is proposed that information about the processing station is displayed on the viewing window by means of a display unit. The display unit has visual display means, by means of which information about the processing station can be displayed on the viewing window. This information is visually formatted in such a way that it can give the operator of the processing station details about the state of the processing station.

The state data of the processing station measured by the sensors are evaluated. On the basis of the evaluation, information about the state of the processing station can be acquired. In the process, it can be established whether all parameters are in the permissible range and the state of the processing station is normal. Furthermore, it can be determined if values of parameters are changing in the direction of unpermitted values. The speed of the change in value can be evaluated and it can concluded from this how probable it is that a parameter will depart from a permissible value range in the future. It can also be determined if a parameter which is not essential for production has departed from a permissible value range. This information can be used to output a warning message. If a parameter which is critical for production departs from a permissible range an error message can be output.

In addition, instructions can be output which can be understood as information about the processing station. Such instructions can, for example, be operator instructions or repair instructions. According to the subject matter, all this information can be displayed in the viewing window. With processing stations, the viewing window usually serves as a means for visually monitoring the processing process. The covering normally obstructs a clear view of the processing station, with the result that a viewing window is provided in the covering, through which the operator can look behind the covering into the processing station. The viewing window is usually made from a visually transparent material and is arranged in the covering in such a way that an operator has a clear view of the processing station or the components essential for the production process there.

Nowadays, the operator has to look at information about the processing station on a monitor which is mounted next to the processing station. This is usually laborious and the operator in the process loses focus on the processing station. It is much more convenient if the operator when viewing the processing station itself, i.e. when viewing the production process, gets the information necessary for operating the processing station displayed directly in his or her field of vision in the viewing window. It is namely the aim of every human-machine interface (HMI) to shorten the communication paths and make them more straightforward. The better and more unambiguous the communication at the HMI is, the easier the operation is for the operator. Therefore, it is proposed according to the subject matter that the information is brought to where it is really required. Information such as numeric values, warnings or error messages are arranged in such a way that they can be read quickly, straightforwardly and comprehensibly by the operator.

According to one embodiment, the viewing window not only serves to provide the operator with a view of the processing station, but is also formed as a mechanical protection for the operator of the processing station. This mechanical protection, on the one hand, prevents the operator from reaching through the viewing window into the processing station and, on the other hand, prevents material from escaping from the processing station through the viewing window. This, by way of example, could be spray water, solvent, sparks, splinters, chips, liquids, fumes or suchlike. Mechanical protection is ensured by means of the viewing window.

Preferably, the viewing window is formed as a pane, for example as a glass pane or as a plexiglass pane. The viewing window can be embedded in the covering and as a transparent element of the covering enables the processing station to be observed.

A particularly simple projection of the information about the processing station is possible if the viewing window is formed as a semi-transparent pane. In this case, the information can be projected onto the viewing window. The projected contents are reflected or scattered in the direction of the operator. The light from the processing station is transmitted through the viewing window.

The covering can have doors or windows and the viewing window can be arranged within them. For example, parts of the covering can be formed by sliding doors which have a frame which is guided along a sliding groove guide and the viewing window is arranged inside the frame. In this case, the frame is constructed with the smallest dimensions possible, so that the viewing window provides the largest possible viewing area of the processing station.

In particular, the covering can encase the processing station and hence serve as a housing. The covering is then part of a housing of the processing station and the viewing window of the subject matter of the invention is provided within this covering.

In order to be able to manually intervene in the production process in the case of an error or for other purposes or in order to be able to manually effect specific settings at the processing station or on its operating means, it is proposed that the covering, at least the viewing window anyhow, can be opened, in order to ensure that the processing station can be manually accessed. The covering preferably serves two different purposes: on the one hand it serves to display information about the processing station in the viewing window and, on the other hand, to provide mechanical protection of the processing station and the operator. However, the covering is not necessarily fixed in place at the processing station but can be removed, for example by means of a hinge or a sliding groove guide, and then provides access to the processing station.

The display unit must be able to display the information about the processing station on the viewing window. For this purpose, the viewing window can be formed as a display controlled by the display unit. The viewing window itself can have controllable optical elements, such as TFT elements, LED elements, OLED elements or suchlike. These optical elements are controlled by the display unit and form the display. The viewing window can be coated with these elements or can be formed from these elements. In the technology, films are already known which can be affixed to panes and by means of suitable controls are able to be optically active. That is to say, that the films can be looked through and, at the same time, the films can visually display information by means of a change in the transparency or through their own emission of light.

It is also possible for the display unit to be formed as a projector and for the viewing window to form a projection screen for this display unit. The information projected by the display unit is reflected or scattered by the projection screen of the viewing window, in particular in the direction of the operator. Light which comes from the processing station can pass through the viewing window, so that the information about the processing station is projected and displayed by the display unit to the operator and he or she retains a direct view of the processing station.

As already explained, production processes nowadays are monitored almost continuously. Various sensors are used which monitor the state of the processing station. The states detected by the sensors can be stored as actual-state data. A central server is preferably provided for this purpose and manages the actual-state data for each processing station or for a plurality of processing stations.

It is also possible to create the information about the processing station by means of the actual-state data. On the one hand, this can be effected by displaying the actual-state data in a way which is understandable for the user in plain text in the viewing window. On the other hand, it is possible for the actual-state data to be displayed on the basis of information derived from rules.

Furthermore, the actual-state data can be compared with target-state data. Such a target-actual comparison enables the parameters of the processing stations to be monitored as to whether they are within the acceptable, permissible ranges. The result of a target-actual comparison can also be used as information about the processing station. If all actual values are within a permissible range, it can be displayed that the processing station is operating properly. If actual-state data change in the direction of critical values or if actual-state data of parameters which are not critical for production depart from permissible ranges, warnings can be output.

If actual-state data of a parameter which is critical for the production process depart from a permissible range, an error can be output. A warning message and an error message can be immediately displayed to the operator in the viewing window. At the same time, the parameter value and the place as well as the name and/or the designation of the sensor can be displayed in the viewing window from which the respective parameter originates.

It is also possible to represent the information about the processing station as icons/symbols. A temperature display can, for example, contain a pictorially represented thermometer. The actual temperature can be displayed as a bar on the thermometer. If the actual temperature exceeds a permissible range, the thermometer can, for example, be coloured red. In the case of a pressure value, an impermissible overpressure, for example, can be represented by a corresponding symbol. The symbols for representing the information about the processing station are selected such that they are immediately understandable to the operator.

According to one embodiment, it is proposed that a display position of the information which is dependent on the sensor measured value is determined in the viewing window dependent on the position of a sensor in the processing station. It is hereby possible to choose the relative position of the display of the information within the display window depending on the position of the sensor in the processing station which is relevant for the information. Therefore, it can make sense, for example, to choose the display position relative to the centre of the viewing window corresponding to the position of the sensor relative to the centre point of the processing station.

A sensor provides state data, particularly for a parameter. These state data can be used to generate information about the processing station. This can be a pictorial representation of the measured value. It is also possible for a symbol to be displayed dependent on a value range. A form of the sensor can also be abstractly represented and, by way of example, the colourings of the sensor can be effected dependent on the state of the measured value relative to the target value. As a result of the fact that the position of the sensor and the display position are dependent on one another, it can be very easy for the operator to spatially assign the displayed information to the sensor in the processing station. In other words, if, for example, a critical value is displayed red at the top on the right in the viewing window, the operator can conclude from this that if he or she looks through the viewing window at the processing station the respective sensor is also arranged at the top on the right in the processing station and hence his or her view is directly focussed on the problem area.

According to one embodiment, it is proposed that a detection unit detects a spatial position of an operator of a processing station. The detection unit can, for example, comprise at least one camera which detects the face of the operator by means of pattern recognition. The movement of the operator relative to the viewing window can be detected and evaluated by means of suitable tracking software. Thus, the spatial position of the operator relative to the processing station, in particular relative to the viewing window, can be detected by means of the detection unit.

If the position of the operator is known, it is possible to determine the display position of the information in the viewing window depending on this detected position of the operator. As a result of this, possible effects by parallaxes can be compensated, so that the operator, irrespective of his or her position, always receives the display position in such a way that it corresponds with the relative position of the corresponding sensor in the processing station, for example.

Preferably, the display position of the information can be determined on a straight line between the operator, in particular the eyes of an operator, and the position of the sensor within the processing station. In this case, the display position of the information is along the direction of view of the operator between the operator and the respective sensor. In other words, if the operator looks at a sensor the information about this sensor is directly displayed to him or her within his or her field of vision along his or her direction of view, as the display position is correspondingly determined. If the operator now moves relative to the viewing window, then the display position is correspondingly shifted.

It is also proposed that the type and/or the content of the information are determined depending on the position of the operator relative to the viewing window. For example, it is possible for a plurality of processing stations to be arranged sequentially one after another or next to one another along a production line. A plurality of these processing stations can have viewing windows. If the operator is at a processing station where all parameters are ok, he or she receives a corresponding positive message in the corresponding viewing window of this processing station. If, however, at another processing station remote from the operator there is a warning indication or an error indication, just a corresponding warning symbol can be displayed if the operator is remote from this viewing window. This symbol is only intended as information that there is actually a warning or error indication. As the operator is remote from this respective viewing window, he or she would not in any case be able to perceive specific information. The warning can, for example, be displayed as a red triangle and/or flashing. The remote operator can also perceive such a warning indication from far away.

If the operator now approaches the viewing window on which the warning indication has appeared, in particular if the operator is standing in front of the respective viewing window, the warning symbol is replaced by a specific description of the warning or the error. In other words, the type of information changes according to whether the operator is remote from the respective viewing window or directly at the respective viewing window. In particular, the information content, in particular the information quantity, can be inversely proportional to how far away the operator is from the viewing window. When the operator is far away from the respective viewing window, the information content or the information quantity can be low, in particular it can only contain two states, namely either warning/error or no information. If the operator then approaches this viewing window, in which the warning or the error is displayed, the quantity of information can increase, e.g. a specific error description can be displayed. In addition, information can already be displayed as to how such an error is to be corrected. The user can remove the viewing window or the covering and correct the error according to the instructions provided to him or her.

It is also possible for the warning indication to be firstly replaced by the specific error description as mentioned when the operator approaches the viewing window from whose processing station the warning indication originates. However, afterwards it is monitored whether the operator tries to correct this error. It can e.g. be monitored whether the operator opens the processing station and/or calls in a technician. After a certain period of time has passed without detection of a manual intervention by the operator, the warning indication can be reactivated and the error description deactivated. A possible deactivation of a warning indication by a user who perhaps takes no manually initiated action, and in this way the error possibly remaining unobserved for a lengthy period of time, can hereby also be prevented.

According to one embodiment, it is proposed that at least two processing stations are provided which are arranged spatially separate from one another. These processing stations can form a production line. Each of the processing stations can have at least one respective viewing window assigned to it. Here, it should be understood that a viewing window does not necessarily have to be assigned to every processing station along a production line. Instead, it is sufficient if a plurality of processing stations, in particular at least two processing stations, along a production line in each case have at least one viewing window assigned to them.

In the course of the processing process, this process is monitored by various sensors. One or more sensors, which monitor the processing in this processing station, can be installed in each processing station. The sensor data can be evaluated in such a way that the received data can be enhanced with information regarding which processing station the sensor is arranged at. Hence, it is possible for sensors to be assigned to processing stations. This assignment can be evaluated and dependent on the assignment of the sensor, from which the information originates, to one of the processing stations that viewing window can be determined in which the information is displayed. It is possible to assign to each viewing window or each display unit which processing station it is arranged at.

Hence, it can be established at which viewing window or at which processing station the respectively relevant sensor value was detected, which resulted in a display. In this way, it is ensured that the information is displayed at the place where it is relevant or where it occurred.

As already explained, a displayed item of information can be a warning indication or an error indication. Here, it is possible for warnings or errors to be represented by means of suitable symbols. For example, a flashing triangle which is displayed in yellow can signify a warning indication and a flashing triangle which is displayed in red can signify an error indication. The closer the operator gets to the processing station concerned, the more specific this information can become.

According to one exemplary embodiment, it is proposed that a preferably wireless communication device is provided. A communication link to a mobile information unit can be established at the processing facility by means of the wireless communication device, for example by means of Near Field Communication (NFC), Bluetooth, W-LAN or suchlike. It can be determined how far away the mobile information unit is from the respective processing station.

Information about the processing station can be transmitted to the mobile information unit depending on the position of the mobile information unit relative to the processing station. If the operator is at a processing station, the information about the processing station can be transmitted to the mobile information unit. For example, it is possible for information with a low information quantity, for example pure symbols, to be displayed in the viewing window. The specific instructions or error descriptions can then additionally be transmitted to the mobile information unit. The operator who is at a viewing window in which a warning symbol or an error symbol is displayed can additionally retrieve information via his or her mobile information unit and intervene accordingly in the production process.

Furthermore, an operator instruction can be received by the mobile information unit and can be displayed on the viewing window by means of the display unit. Here, it is, for example, possible for an operator instruction or direction to be generated remote from the processing station, which is then transmitted to the mobile information unit. The operator can then transmit this information from the mobile information unit to the viewing window and gets this operator instruction displayed directly in his or her field of vision. It is hereby possible to display to the operator in his or her field of vision what is to be done and how, in order to make the processing station run smoothly in terms of production.

The viewing window therefore serves as a means for producing "augmented reality". What is seen by the operator is enhanced by information which is overlaid in the viewing window. Hence, the operator sees the processing station through the viewing window and the corresponding operating means of the processing station. This view is enhanced by the information about the processing station which is overlaid in the viewing window. The operator can operate the processing station better and possibly correct errors more quickly by means of the enhanced information.

As already explained, a further aspect is a method for operating a processing facility. Such a processing facility can have one or more processing stations. The processing stations process packaging material, for example, in which they form it into packages and fill them with contents, for example foodstuffs. Different operating means, for example folding units, sterilisation units, filling units, closing units, conveying units, printing units, measuring units or suchlike, interact with one another in different processing steps and process a packing material and a filling material into a filled package.

Starting from an infeed channel and ending with an outfeed channel, a filled package is created from an unfolded package sleeve, for example. During this processing, the product passes through various processing stations and it is proposed that information about the processing station is displayed in the viewing window. A viewing window can be assigned to a processing station. This viewing window serves to enable the operator to visually monitor the processing process of the processing station, in which he or she can look through the viewing window at the operating means of the processing station. The visual information obtained can be enhanced by overlaying or displaying further information in the viewing window. By displaying information about the processing station, "augmented reality" is created. Information can be displayed to the operator as operator instructions, operating data, control data, operating parameters or suchlike. In addition, instructions for correcting errors or preventing errors can be displayed.

According to one embodiment, it is proposed that a direction arrow is displayed in a viewing window which is next to or adjacent to a viewing window in which a warning indication or an error indication is displayed, this direction arrow pointing in the direction of the viewing window in which the warning indication or the error indication is displayed, or a message is displayed that a warning indication or an error indication is displayed in another viewing window.

In the first instance, it is proposed that a corresponding indication is displayed in the viewing window which is assigned to the processing station in which a warning or error has occurred.

This can be effected by means of a pictogram or symbol. In order to reliably draw the operator's attention to such a warning or error indication, it is proposed that a direction indication is displayed in other viewing windows, in particular in adjacent viewing windows, which focuses the attention of the operator onto the viewing window or the processing station in which the warning or error has occurred. Thus, an operator who is walking along a production line can read at a viewing window which direction he has to walk in in order to reach the viewing window or the processing station where the error or the warning has occurred. Anyhow, at least it is possible to display in adjacent viewing windows that a warning indication has occurred in another viewing window. This draws increased attention from the operator, who following this will look along the production line for the viewing window in which the warning or error indication is displayed.

According to one embodiment, it is proposed that a display size and/or a display position and/or a type of display of information in the viewing window are determined dependent on an amount of a deviation of an actual-state variable from a target-state variable. The variable, the position or the type can also be dependent on an amount of an absolute change or a rate of change of an actual-state variable. The direction of the change can also be relevant.

For example, it is possible in the case of a slight deviation of the actual-state variable from a target-state variable, for example in a certain percentage range, for initially only a warning indication to be output. That is to say, the type of display is a warning indication. However, as soon as the deviation lies outside a tolerance range, the type of display can change into an error indication.

The display variable can also be dependent on the deviation from the target-state values. The greater the deviation is, the greater the display can be. In particular, when a limit value is exceeded the display can change from a first size into a second size. In particular, when a tolerance value is exceeded, the display variable can occupy at least 50% of the viewing window. The display of an actual-state variable can also be in a peripheral area of the viewing window if this state variable lies in a permissible range. As soon as the actual-state variable approaches a critical range or moves out of a tolerance range, the display position can be changed from the peripheral area to a central area of the viewing window. This draws increased attention from the operator, so that he or she immediately discovers if during the processing process parameters of the processing station become critical or already result in an error. He or she can then very quickly halt the production process and where necessary initiate a correction of the error. He or she can do this due to the fact that he or she has already been provided with information in the viewing window as to how the error is to be corrected. It is only when the operator does not succeed in correcting the error that an additional technician can be called. The likelihood of the operator correcting the error is considerably increased by the fact that the operator directly receives operator instructions in the viewing window. This results in fewer downtimes of the processing station and hence results in higher productivity.

A further aspect is the use of such a facility in a packaging facility or a filling facility. A large number of parameters have to be observed particularly in the packaging and filling processes, so that an error-free production process is ensured. In order to be able to reliably observe all these parameters and where necessary quickly intervene, the solution of the subject matter of displaying information about the packaging station in the viewing window of the packaging station provides considerable advantages compared to conventional methods.

BRIEF DESCRIPTION OF THE DRAWINGS

The subject matter is explained in more detail below with the aid of the figures illustrating exemplary embodiments. In the figures show.

DETAILED DESCRIPTION OF THE INVENTION

Figure 1:
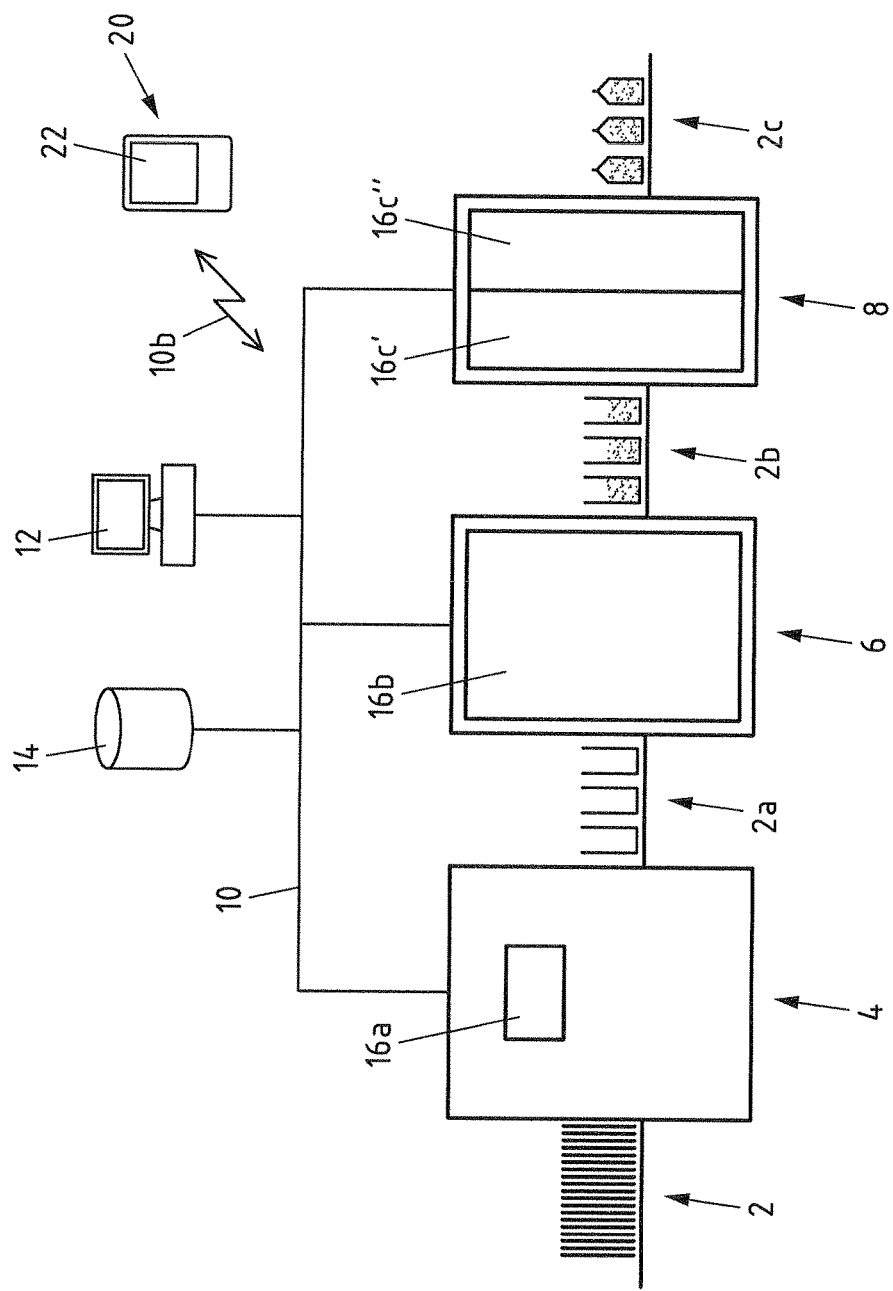
FIG. 1 a schematic view of a filling installation.

The representation of information about the state of a processing facility according to the subject matter can be demonstrated, by way of example, at a filling facility In a filling installation, for example for foodstuffs, package sleeves 2 produced from packaging material are firstly fed into an unfolding device 4. In the unfolding device 4, the package sleeves 2 initially folded flat together are unfolded and closed on one side.

The unfolded package sleeves 2a are then conveyed to a filling device 6. The foodstuff is filled into the unfolded package sleeves 2a in the filling device 6.

The package sleeves 2b filled by the filling device 6 are then conveyed to a closing unit 8. In the closing unit 8, the gables of the filled package sleeves 2b are closed, for example by welding/sealing the gable edge. The closed, filled packages 2c are then fed out of the closing unit 8.

Of course, the above representation of a filling facility is purely schematic. Notably, no sterilisation unit, for example, is provided. A sterilisation unit can be present in the filling device 6. It is also possible for the devices to be encased in a common housing, in particular the filling device 6 and the closing unit 8 can be encased together in a housing in a sterilisation area. Other stations can be part of a filling facility, but for a clearer overview they are not represented.

It can be seen in FIG. 1 that each of the devices 4-8 is connected to a control computer 12 and a database 14 via a data link 10 (communication link). The data link 10 can be a wired LAN connection for example. Wireless connections can also be implemented, for example by means of WLAN. It is also possible for a mixture of different types of data links 10 to be used.

The devices 4-8 receive control instructions from the control computer 12, by means of which the operating means can be hydraulically, pneumatically and/or electrically operated according to predefined rules. Inside the devices 4-6, parameters of the operating means are detected by means of various sensors, as already described above by way of example. The collected state data, that is to say, the values of the respective parameters, are transmitted by the sensors of the devices 4-8 to the control computer 12 and/or to the database 14. In the database 14, a complete record for each batch from package sleeves 2a to the filled packages 2c relating to the respective parameters can be reproduced. The control computer 12 evaluates the operating parameters and applies control rules, in order to correspondingly control the devices 4 to 6.

Also this description of the control of the devices 4 to 8 is purely by way of example and purely schematic. For the subject matter, it can just be important that with the aid of the parameters detected by sensors, operating states of the devices 4 to 8 are determined by means of the control computer 12 and/or by means of the database 14 and, dependent on the operating states, instructions, indications, warnings or error messages or any other information about the processing station are generated for an operator of the devices 4 to 8 and subsequently displayed in the viewing window. Directions, operator instructions, warnings, error messages and operating data can, according to the subject matter of the invention, be visually presented to the operator by means of overlays in viewing windows, which are in any case present in coverings of the devices 4 to 8.

In FIG. 1, it can be identified that for example in the unfolding device 4 a viewing window 16a is provided. The viewing window 16 is integrated like a window into the covering of the unfolding device 4. For example, the covering of the unfolding device 4 can have a front door, into which the viewing window 16a is integrated. This door can be opened, in order to gain access to the operating means of the unfolding device 4.

The filling device 6 has an extensive viewing window 16b which almost occupies the whole area of a door of the covering of the filling device 6. The operator can view the complete filling device through this viewing window and receive further information about the filling device 6 via the viewing window 16b.

The closing device 8 has two sliding doors, each of which has a viewing window 16c', 16c'' respectively. Each of the viewing windows 16c', 16c'' can be slid along a sliding groove guide, so that by sliding the viewing windows 16c', 16c'' to the right or to the left the operator has access to the operating means of the closing device 8.

Of course, the illustrated viewing windows 16a to 16c purely serve as examples. A viewing window consisting of glass, plexiglass or another transparent or semi-transparent material can be provided in a covering which can be arranged as a surrounding housing or only as a mechanical protection at a device 4 to 8. The operator can view the operating means of the respective device 4-8 via this viewing window 16a-16c. In addition, according to the subject matter of the invention, the operator receives additional information about the respective devices 4 to 6 via the viewing windows 16a-16c. Such additional information is overlaid in the viewing windows 16a-16c.

Figure 2A:
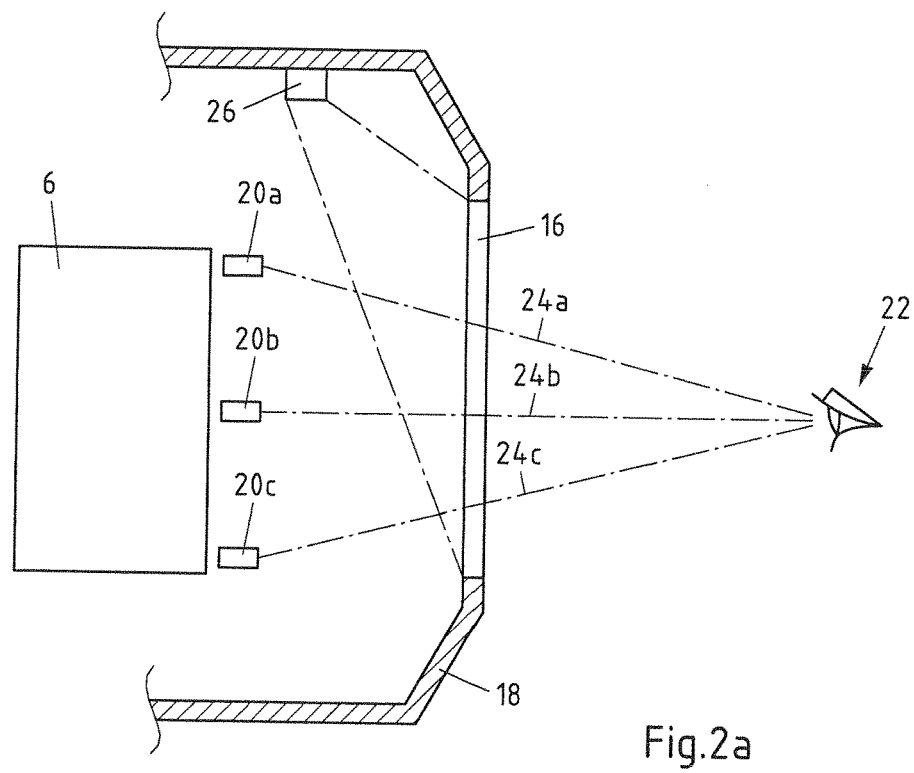
FIG. 2a a first illustration of a viewing pane.

FIG. 2a schematically shows a processing facility, for example one of the devices 4-8, with a covering 18 and a viewing window 16. Here, the filling device 6 is illustrated by way of example. Various sensors 20a-20c are arranged at the filling device 6. The filling device 6 with its operating means is purely schematically illustrated as a block and it should be understood that operating means which are driven hydraulically, pneumatically, electrically and/or in another way are present in the filling device 6.

Furthermore, the covering 18 is only partly shown. The covering 18 can also fully surround the filling device 6 and in this way form an aseptic area for example. The viewing window 16 is formed in the covering 18 as a safety glass pane for example. However, it is also possible for the viewing window to be formed from another material which is at least semi-transparent. Here, plexiglass is appropriate for example. The viewing window 16 can also be coated, in order to influence its transmission and/or reflection properties.

The sensors can, for example, be a photoelectric sensor 20a, a temperature sensor 20b and a pressure sensor 20c. All other types of sensors are also possible.

An operator 22 is also illustrated in FIG. 2a. Here, for example, different directions of view 24a-24c of the operator 22 are illustrated.

Finally, a display device 26 is illustrated in FIG. 2a. The viewing window 16 is formed as a rear projection screen for the display device 26 in FIG. 2a. In other words, from the view of the operator 22 the rear side of the viewing window 16 serves as a projection screen. A display is overlaid onto this projection screen on the viewing window 16 by the display device 26. The type of display which is overlaid onto the viewing window 16 by the display device 26 is, for example, controlled by the control computer 12 and/or the database 14 and/or higher-level control computers which are not illustrated here. For this purpose, the display device 26 is connected via the data link 10 to the control computer 12 and a data network possibly arranged behind it (not illustrated).

The form of the viewing window 16 can correspond to the illustrations in FIG. 1 for example. However, any other forms and types of viewing windows 16 are also possible. What is essential is that the viewing window 16 at least partly provides the operator 22 with a view of the installation, in this case the filling device 6 and its sensors 20a to 20c. In FIG. 2a, it is assumed that the operator 22 is standing centrally in front of the viewing window 16. In this case, it is possible to at least approximately determine in advance the lines of sight 24a-24c along which the operator 22 is looking at a respective sensor 20a-20b. By means of this information, the display device 26 can be controlled in such a way that information relating to the photoelectric sensor can be at least partly displayed in the area of the line of sight 24a. Information relating to the temperature sensor 20b is at least partly displayed on the line of sight 24b and information relating to the pressure sensor 20c is at least partly displayed on the line of sight 24c.

Furthermore, additional information relating to the operating states and parameter values of the filling device 6 can be overlaid on the viewing window 16 by means of the display device 26. The operator 22 is hereby provided with additional information when he or she looks at the filling device 6, which makes the operation of the filling device 6 easier for him or her. Instructions or warnings can be overlaid for him or her, by means of which he or she can operate the filling device 6 without consulting an additional technician.

Figure 2B:
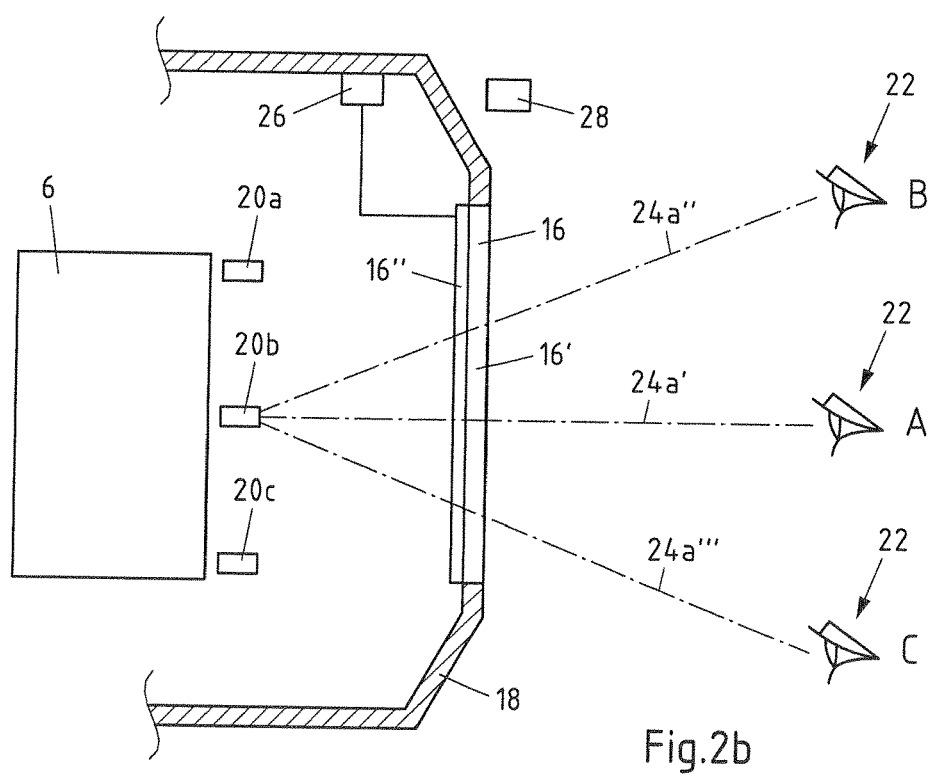
FIG. 2b a second illustration of a viewing pane.

FIG. 2b shows the filling device 6 essentially according to FIG. 2a. In FIG. 2b, only the display device 26 and the viewing window 16 are different compared to FIG. 2a. A tracking camera 28 is also provided on the covering 18, by means of which a position A, B, C of an operator 22 can be detected.

The display device 26 and the tracking camera 28 are connected to the control computer 12 and/or the database 14 via the data link 10.

The viewing window 16 is illustrated split into two parts in FIG. 2*b*. On the one hand, the viewing window 16 has a transparent pane 16' and, on the other hand, it has a semi-transparent display 16" arranged on the pane 16'. This display 16" enables information to be visually presented.

Of course, the various viewing windows 16 in FIGS. 2*a* to 2*d*, the various display devices 26 and the various tracking cameras 28 are combinable and exchangeable with one another. All the features which are described in the figures are interchangeable.

In order to overlay information to the operator 22 relating to the sensor or operating means, which he or she at the moment is looking at, directly in his or her field of vision along his or her line of sight 24*a*, the position A, B or C of the operator 22 is detected by means of the tracking camera 28. Then, the line of sight 24*a*', a" or a'" of the operator 22 onto that sensor 20 relating to which information is directly overlaid is calculated. By way of example, it is illustrated in FIG. 2*b* that a crucial temperature, for example, is overlaid relating to the temperature sensor 20*b*.

The temperature sensor 20*b* measures, for example, the temperature of the product to be filled which, for example, is not allowed to be heated above 90 degrees Celsius. If the temperature of the product to be filled reaches, for example, 88 degrees Celsius, this can be a critical temperature. In this case, the temperature together with a warning indication, for example a symbol for the temperature sensor 2*b*, is displayed by the display device 26. For this purpose, which position A, B or C the operator 22 has at the current point in time is communicated to the display device 26. The display device 26 thereupon determines the line of sight 24*a* of the operator 22 onto the sensor 20*b*. The information relating to the sensor 20*b* is now overlaid into this line of sight by means of the display device 26. In other words, if the operator is standing at position A, information relating to the temperature sensor 20*b* is overlaid to him or her along the line of sight 24*a*'.

If, on the other hand, the operator 22 is at position B, the line of sight 24*a*" is another line of sight onto the temperature sensor 20*b* and the display device 26 causes the information relating to the temperature sensor 20*b* to be overlaid on this line of sight 24*a*". The same applies for position C of the operator 22, in which the information relating to temperature 20*b* is overlaid on the line of sight 24*a*'". The user 22 can hereby always gain access to information in his or her direction of view of that operating means relating to which this information has been overlaid. Overlapping the overlaid information with the visual sensory perceptions of the real operating means facilitates the assignment of the information to the respective operating means.

Figure 2C:
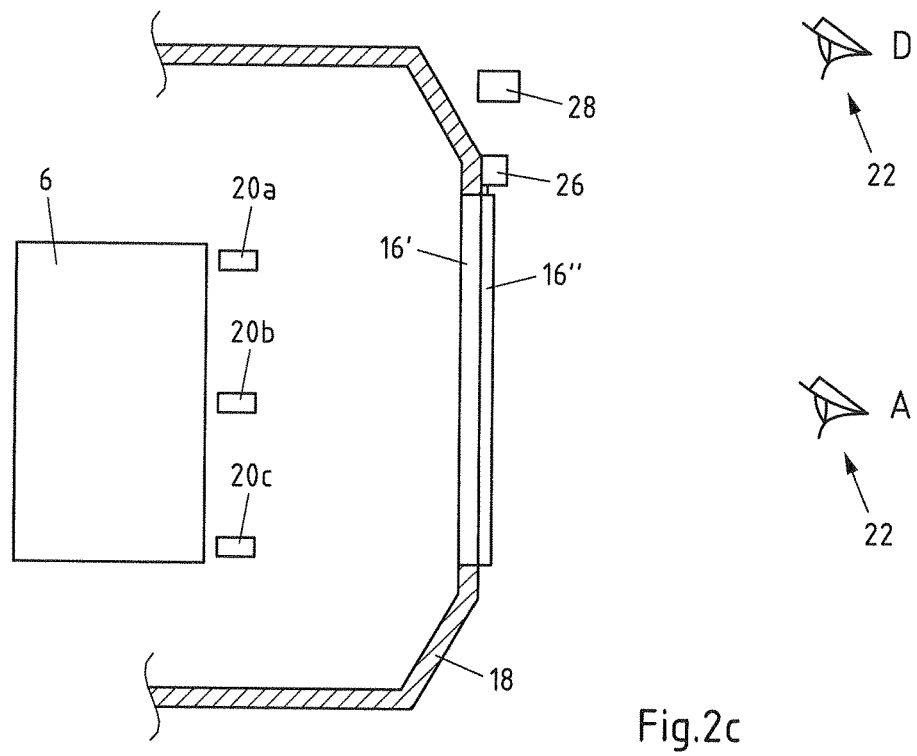
FIG. 2c a third illustration of a viewing pane.

FIG. 2*c* shows a similar arrangement as in FIGS. 2*a* and 2*b*. In contrast to the previous figures, the display device 26 is attached to a display 16" which is mounted on the outside of the viewing window 16'. Such a display 16" can correspond to the display 16" in G 2*b*. A position A, D of the operator 22 can be detected by means of a tracking camera 28. The position A, D of the operator 22 can be decisive for the type of overlaid information.

A position A of the operator 22 in the area of the viewing window 16 or the covering 18 can result in the display device 26 displaying plain text information relating to operating means of the filling device 6. Since the operator 22 is in the close vicinity of the filling device 6 and hence in the close vicinity of the viewing window 16, he or she can receive detailed information relating to a warning, an error or operator instructions. He or she can read them immediately, since he or she is so close to the viewing window.

However, if the operator is further away from the viewing window 16, in particular at an angle of more than 60 degrees from the centre axis of the viewing window 16, it can be concluded that the operator 22 can only perceive information on the display 16" in his or her outer field of vision. This results in the display device 26 being instructed to display less detailed information. This can, for example, be a display of a large symbol which symbolises a warning or an error. The operator 22 can also perceive such a symbol from far away and then go to the filling device 6 in order to obtain details relating to the warning or error. The tracking camera 28 detects that the operator 22 has, for example, moved from position D to position A and this leads, by means of the display device 26, to the symbol which was previously displayed becoming detailed information.

Figure 2D:
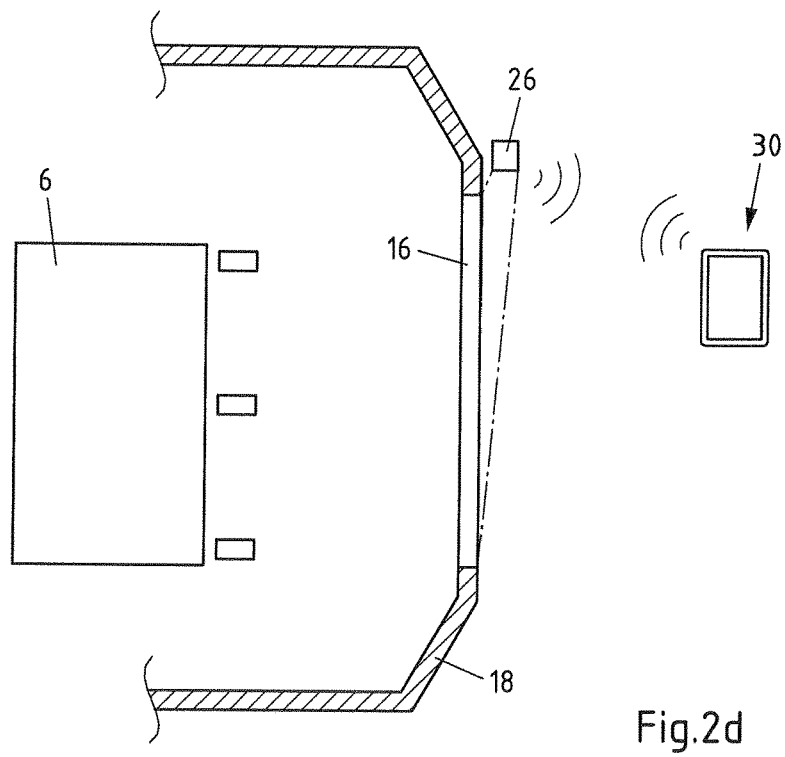
FIG. 2d a fourth illustration of a viewing pane.

FIG. 2*d* shows a similar arrangement as in FIGS. 2*a* to 2*c*. However, here, in contrast, the display device 26 is arranged as a front projector. That is to say, the information is projected onto the viewing window 16 on the front side by means of the display device 26. For this purpose, the viewing window 16 has a semi-transparent coating on its front side, so that light, which is projected by the display device 26 onto the viewing window 16, is at least partly reflected and also if possible in the direction of the centre axis of the viewing window 16.

In addition, FIG. 2*d* illustrates that a mobile information unit 30 can be provided. This can be a mobile telephone or a mobile PDA, for example a tablet computer. The information which is overlaid on the viewing window 16 can be transmitted wirelessly from the display device 26 to the information unit 30. Furthermore, additional information relating to the information which is currently displayed on the viewing window 16 can be transmitted from the display device to the information unit 30.

It is also possible for the display device 26 to receive information from the information unit 30. It can make sense if the information unit 30 belongs to a technician, for example, who wants to help the operator. The technician can convey additional information for operating the filling device 6 from his or her information unit 30 to the display device 26. This then correspondingly displays the information on the viewing window 16 and the technician with the aid of the additionally displayed information can very easily explain to the operator 22 how he or she can correct a possible error for the filling device 6 or how he or she can adjust the sensors 20*a*-20*c*. For the operator, what is explained registers particularly well, since the technician's description is enhanced by additional information which is displayed on the viewing window 16.

FIGS. 3*a*-3*f* show examples of the display on the viewing window. FIGS. 3*a* to 3*f* respectively show an image on a viewing window 16, as it is perceived by an operator 22. In the FIGS. 3*a* to 3*f*, dashed lines are to be interpreted as representing the actual operating means, for example of the filling device. Here, both actuators and sensors can act as operating means and can, by way of example, represent the sensors 20*a* and 20*b* as parts of the filling device 6 in FIG. 3*a*. Therefore, the operator sees through the viewing window 16 the filling device 6 with the sensors 20*a* and 20*b*. Solid lines represent what is displayed on the viewing window 16. The real information (dashed) is overlaid with the displayed information (solid) on the viewing window.

Figure 3A:
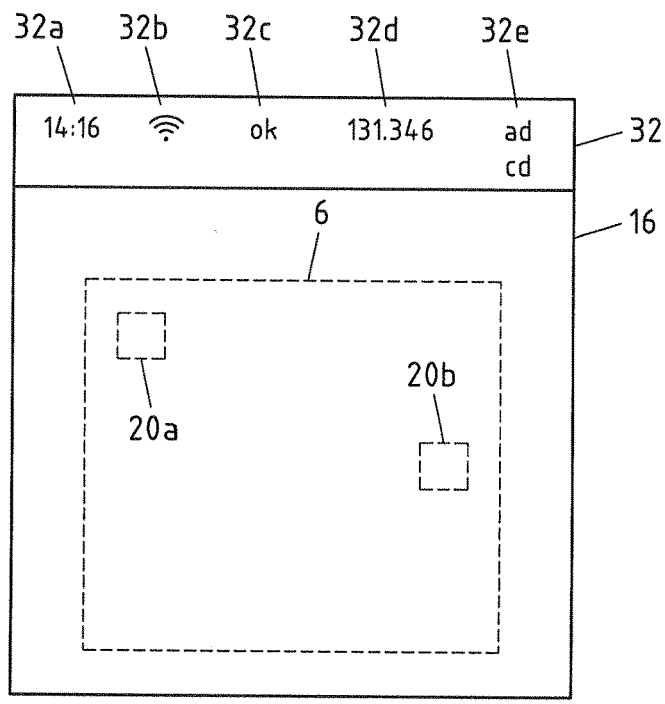
FIG. 3a a first illustration of a display.

A so-called "home screen" is illustrated in FIG. 3*a*. This view can be presented to the operator 22, for example, if the filling device 6 is working properly and no manual intervention is necessary. The current time 32a, the signal strength 32b of a wireless network, the state 32c of the filling device 6, the batch number 32d of the currently processed package and all current user accesses 32e to the filling device 6, for example, can be displayed to the operator 22 on the upper screen edge. In this way, the operator 22 can observe at a glance the filling device 6 along with additional information. In particular, the display of the accesses 32e to the filling device 6 enable the operator to monitor who is currently intervening in or observing the process of the filling device 6.

Figure 3B:
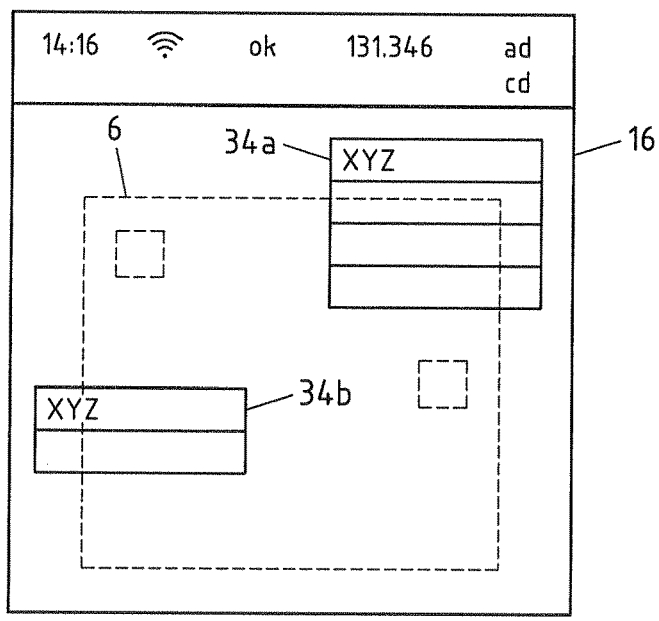
FIG. 3b a second illustration of a display.

FIG. 3b shows the viewing window 16, in which additional information windows 34a, 34b are displayed to the operator 22 when he or she looks at the filling device 6. The positioning of the information windows 34a, 34b can be determined by the control computer 12. This positioning can also be dependent on the position of the operator 22, as already described in connection with FIGS. 2a and 2b.

Current operating information, state data, operator instructions or suchlike can be overlaid in the information windows 34a, 34b. These can be fed in by an external computer, for example, in order to draw the operator's 22 attention to certain things. It is also possible for the operator 22 to invoke the information windows 34a, 34b via the information unit 30. To that end, he or she can, for example, arrange for information to be correspondingly retrieved by the control computer 12 or for this information to be transmitted from the information unit 30 to the display device 26. The information can contain both symbols and plain text.

Figure 3C:
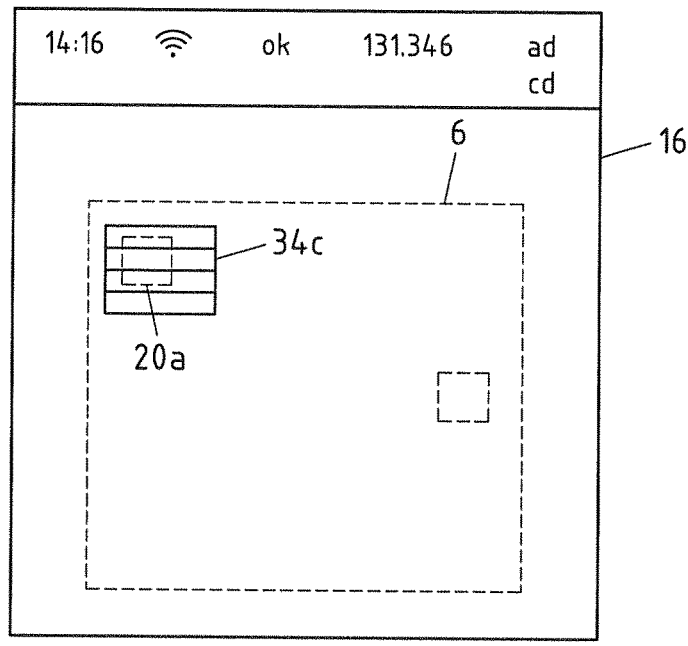
FIG. 3c a third illustration of a display.
Figure 3D:
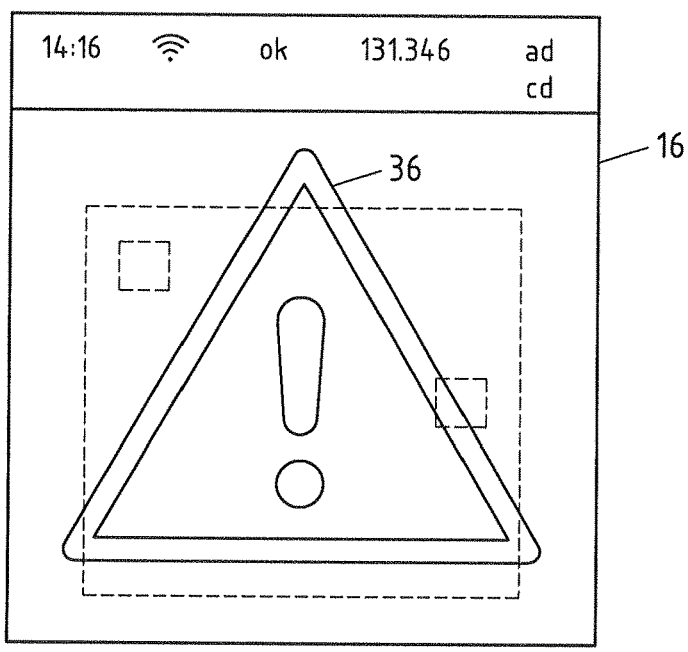
FIG. 3d a fourth illustration of a display.

FIG. 3c shows a further example, in which an information window 34c is positioned in the area on the viewing window 16 which lies in the line of sight of the operator 22 onto the sensor 20. This can be useful, for example, if information relating to the sensor 20a is to be displayed in the information window 34c. The information can be both symbols and plain text. For example, the information 34c can merely be a coloured circle which indicates that something has to be adjusted on the sensor 20a. The operator 22 can then manually adjust or exchange the sensor 20a by opening the covering or the viewing window 16. Therefore, when looking at the sensor 20a the operator 22 directly receives the information from the information window 34c.

If the operator 22 is at position D, for example, he or she is remote from the viewing window 16. In this case, he or she is not able to pick up any detailed information from there. However, in the case of an error, it is also, as illustrated in G 3d, by way of example proposed that a warning indicator is displayed as symbol 36 in the viewing window 16, so that the operator 22 is also able to detect this error out of the corners of his or her eyes. This symbol 36 is, for example, displayed over a large area in the viewing window 16 and can be displayed in a signal colour, for example red. It is also possible for the symbol 36 to be displayed flashing. Even if the operator 22 is remote from the viewing window 16, he or she can certainly notice such a warning indicator or the symbol 36.

Figure 3E:
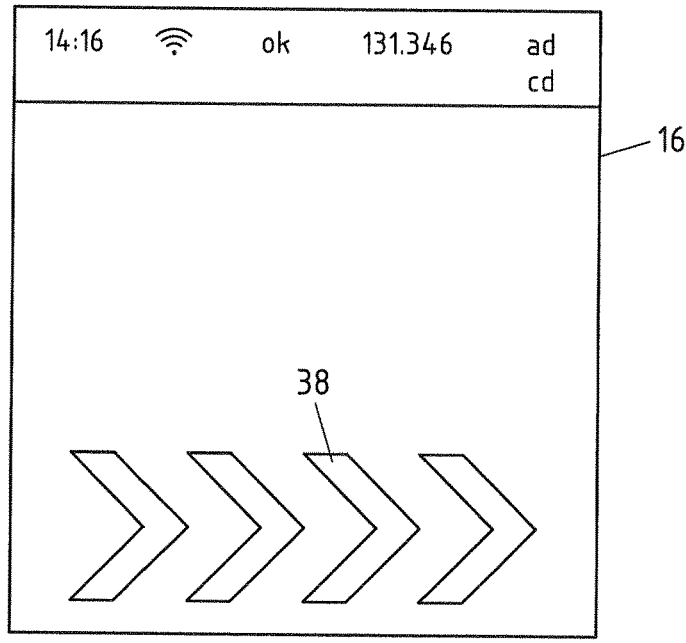
FIG. 3e a fifth illustration of a display.

In order to be able to guide the operator 22, who is monitoring a whole production line for example, quickly to the error location in the event of an error, it is also possible, as illustrated in FIG. 3e, to display direction indicators 38 on the viewing window 16. These direction indicators 38, which are arrow-shaped for example, show the direction which that viewing window 16 on which an error message is displayed as symbol 36 is in. Hence, the operator 22, who is remote from the error location, can be alerted from there as to which direction he or she has to move in in order to get to the error.

Figure 3F:
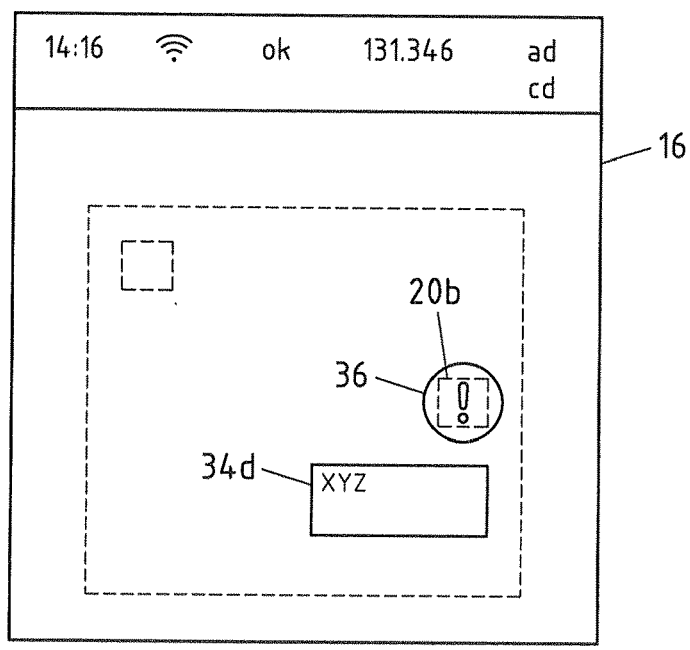
FIG. 3f a sixth illustration of a display.

When the operator 22 has been guided to the error location for example by means of the direction indicators 38 according to FIG. 3e, he or she is able, when he or she has reached the location, to recognise the error as an error indication according to FIG. 3f. Here, it is illustrated that for example the symbol 36, if the operator 22 is directly at the viewing window 16, is limited to the area in which the error has occurred. In the present case, this, by way of example, is the sensor 20b. The symbol 36 is arranged in such a way that it lies in the line of sight of the operator 22 to the sensor 20b. The operator therefore immediately recognises that something is wrong at the sensor 20b.

An information window 34d can be additionally displayed, on which both the type of error and possibly operator instructions can be displayed to the user 22, in order to correct the error. Hence, the operator 22 can recognise the error through the viewing window 16 and additionally receives instructions how to correct it. Subsequently, the operator 22 can remove the covering 18 or the viewing window 16 and correct the error according to the instructions provided in the information window 34d.

The productivity of processing facilities can be considerably increased by means of the solution of the subject matter, since malfunctions can be recognised at an early stage and the operator can be given instructions to correct them. These occur directly at the installation and are easily understandable to the operator. By assigning the information to the real visual sensory perceptions of the operator, it is possible to make instructions particularly understandable to the operator.

LIST OF REFERENCE SYMBOLS

2 Package sleeves
2a Unfolded package sleeves
2b Filled package sleeves
2c Filled package
4 Unfolding device
6 Filling device
8 Closing device
10 Data link
12 Control computer
14 Database
16a, b Viewing window
16' Pane
16" Display
18 Covering
20a Photoelectric sensor
20b Temperature sensor
20c Pressure sensor
22 Operator
24a-c Line of sight
26 Display device
28 Tracking camera
30 Information unit
32 Upper screen edge
32a Time
32b Signal strength
32c State
32d Batch number
32e Access
34a-d Information windows
36 Symbol
38 Direction indicator

The invention claimed is:

1. A processing facility comprising:
   at least one processing station; and
   at least one covering at least partly surrounding the processing station, wherein the covering has at least one viewing window,
   wherein a display unit displays at least one item of information about the processing station on the viewing window,
   wherein the type of information is determined dependent on a position of the operator relative to the viewing window;
   wherein the type of information changes according to whether the operator is remote from the viewing window or directly at the viewing window, wherein the display unit displays a first type of information on the viewing window as the at least one item of information when the operator is remote from the viewing window, wherein the display unit displays a second type of information on the viewing window as the at least one item of information when the operator is directly at the viewing window, wherein the second type of information includes a different type of information than the first type of information, and wherein the first type of information and the second type of information are associated with a same warning or error about the processing station.

2. The processing facility of claim 1, wherein at least one of: the viewing window forms a mechanical protection of the processing station, the viewing window is formed as a pane, the viewing window is formed as a semi-transparent pane, the viewing window is arranged in a door of the covering, the covering is formed as part of a housing of the processing station, the covering is openable, or any combination thereof.

3. The processing facility of claim 1, wherein the viewing window is formed as a display controlled by the display unit, or in that the viewing window is formed as a projection screen for the display unit.

4. The processing facility of claim 1, wherein at least one of: the at least one item of information about the processing station is dependent on at least one state of the processing station, at least one state of the processing station is detected by at least one sensor, the detected state is stored as actual-state data in a central server, the information about the processing station is created from at least parts of the actual-state data, the information about the processing station is created dependent on a target-actual comparison between the actual-state data and the target-state data, or any combination thereof.

5. The processing facility of claim 1, wherein a display position of the information in the viewing window is determined dependent on the position of a sensor in the processing station.

6. The processing facility of claim 1, wherein at least one of: a detection unit detects a spatial position of an operator of the processing station, the display position of the information in the viewing window is determined dependent on the detected position of the operator, or any combination thereof.

7. The processing facility of claim 1, wherein at least two processing stations are provided which are arranged spatially separate from one another, and in that at least one viewing window is assigned to the processing stations respectively.

8. The processing facility of claim 1, wherein sensors are assigned to processing facilities respectively, and in that dependent on the assignment of the sensor, from which the information originates, to one of the processing stations that viewing window is determined in which the information is displayed.

9. The processing facility of claim 1, wherein the displayed information is a warning indication or an error indication.

10. The processing facility of claim 1, further comprising a wireless communication device, wherein at least one of: the information about the processing station is transmitted to a mobile information unit by the wireless communication device, an operator instruction is received by the mobile information unit and displayed on the viewing window by the display unit, or any combination thereof.

11. The processing facility of claim 6, wherein the display position is determined in a straight line between the position of the operator and the position of the sensor.

12. The processing facility of claim 2, wherein the viewing window is formed as a display controlled by the display unit, or in that the viewing window is formed as a projection screen for the display unit.

13. The processing facility of claim 1, wherein the first type of information includes a warning symbol for the same warning or error about the processing station, and wherein the second type of information includes a specific description of the same warning or error that replaces the warning symbol.

14. A method for operating a processing facility of claim 1, wherein information about the processing station is displayed on the viewing window, wherein the type of information is determined dependent on a position of the operator relative to the viewing window.

15. The method of claim 14, wherein a direction arrow is displayed in a viewing window which is next to a viewing window in which a warning indication or an error indication is displayed, this direction arrow pointing in the direction of the viewing window in which the warning indication or the error indication is displayed, or a message is displayed that a warning indication or an error indication is displayed in another viewing window.

16. The method of claim 14, wherein at least one of: status information is displayed in peripheral areas in a viewing window, the warning indication or the error indication is displayed in a central area in a viewing window, or any combination thereof.

17. The method of claim 14, wherein at least one of: a display size, a display position, a type of display of information in the viewing window, or any combination thereof is determined dependent on an amount of a deviation of an actual-state variable from a target-state variable.

18. The method of claim 15, wherein at least one of: status information is displayed in peripheral areas in a viewing window, the warning indication or the error indication is displayed in a central area in a viewing window, or any combination thereof.

19. A method of operating a packaging facility or a filling facility comprising using a processing facility according to claim 1.

* * * * *